(12) United States Patent
Hurd et al.

(10) Patent No.: US 10,136,361 B2
(45) Date of Patent: Nov. 20, 2018

(54) METHOD AND RADIO NETWORK NODE FOR MANAGING A REQUEST FOR A RADIO ACCESS BEARER

(71) Applicant: TELEFONAKTIEBOLAGET L M ERICSSON (PUBL), Stockholm (SE)

(72) Inventors: Magnus Hurd, Stockholm (SE); Robert Karlsson, Sundbyberg (SE); Mai-Anh Phan, Herzogenrath (DE); Xiaoling Wang, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 103 days.

(21) Appl. No.: 14/653,182

(22) PCT Filed: Dec. 17, 2012

(86) PCT No.: PCT/SE2012/051404
§ 371 (c)(1),
(2) Date: Jun. 17, 2015

(87) PCT Pub. No.: WO2014/098658
PCT Pub. Date: Jun. 26, 2014

(65) Prior Publication Data
US 2015/0334600 A1 Nov. 19, 2015

(51) Int. Cl.
*H04W 28/18* (2009.01)
*H04W 72/04* (2009.01)
*H04W 76/10* (2018.01)

(52) U.S. Cl.
CPC ......... *H04W 28/18* (2013.01); *H04W 72/048* (2013.01); *H04W 72/0486* (2013.01); *H04W 76/10* (2018.02)

(58) Field of Classification Search
None
See application file for complete search history.

(56) References Cited

U.S. PATENT DOCUMENTS

| 2010/0202382 | A1* | 8/2010 | Park | H04L 5/0053 370/329 |
| 2011/0044228 | A1* | 2/2011 | Song | H04W 72/005 370/312 |
| 2011/0267944 | A1* | 11/2011 | Stjernholm | H04L 47/824 370/230 |
| 2011/0292915 | A1* | 12/2011 | Prakash | H04L 5/0064 370/336 |

(Continued)

FOREIGN PATENT DOCUMENTS

| CN | 102143597 A | 8/2011 |
| EP | 2466922 A1 | 6/2012 |

(Continued)

OTHER PUBLICATIONS

Extended European Search Report dated Nov. 20, 2015, issued in European Patent Application No. 12890386.1, 11 pages.
(Continued)

*Primary Examiner* — Nicholas Sloms
(74) *Attorney, Agent, or Firm* — Rothwell, Figg, Ernst & Manbeck, p.c.

(57) ABSTRACT

A method and a radio network node for managing a request for a radio access bearer. The radio network node determines a first value relating to utilization of radio resources in a first set of subframes. The first set of subframes includes a second set of subframes, dedicated for transmission by the radio network node to multiple radio communication devices, and a third set of subframes. The radio network node determines a second value relating to utilization of radio resources in the third set of subframes. The radio network node receives the request and obtains an indication relating to a capability of a radio communication device to receive transmission in one or more of the second set of subframes. The radio network node determines a response to the request based on the first value, the second value and the indication, and sends the response to the network node.

27 Claims, 3 Drawing Sheets

(56) References Cited

U.S. PATENT DOCUMENTS

| | | | |
|---|---|---|---|
| 2012/0044850 A1* | 2/2012 | Wang | H04W 72/005 370/312 |
| 2012/0176965 A1* | 7/2012 | Zhu | H04B 7/0689 370/328 |
| 2012/0188878 A1 | 7/2012 | Simon | |
| 2012/0213141 A1 | 8/2012 | Damnjanovic | |
| 2012/0314690 A1* | 12/2012 | Xu | H04W 36/02 370/331 |
| 2013/0142166 A1* | 6/2013 | Bogineni | H04W 8/02 370/331 |
| 2014/0177590 A1* | 6/2014 | Sirotkin | H04W 52/0225 370/331 |

FOREIGN PATENT DOCUMENTS

| | | |
|---|---|---|
| EP | 2693824 A1 | 2/2014 |
| WO | 2009118640 A1 | 10/2009 |
| WO | 2009133444 A1 | 11/2009 |
| WO | 2011019172 A2 | 2/2011 |
| WO | 2011044290 A1 | 4/2011 |
| WO | 2012097923 A1 | 7/2012 |
| WO | 2012116219 A1 | 8/2012 |
| WO | 2012129970 A1 | 10/2012 |

OTHER PUBLICATIONS

Nokia Corporation et al. "Reusing leftover MBSFN subframes for unicast" 3GPP TSG-RAN WG2 Meeting #67, R2-094912, 2009, 3 pages.

RAN WG 1 "LS on the unicast usage in MBSFN subframe" 3GPP TSG RAN WG2 Meeting #75bis, R2-114856, 2011, 2 pages.

First Chinese Office Action with English Translation, issued in Chinese Patent Application No. 201280077738.7, dated Dec. 21, 2017, 13 pages.

* cited by examiner

METHOD AND RADIO NETWORK NODE FOR MANAGING A REQUEST FOR A RADIO ACCESS BEARER

CROSS REFERENCE TO RELATED APPLICATION(S)

This application is a 35 U.S.C. § 371 National Phase Entry Application from PCT/SE2012/051404, filed Dec. 17, 2012, designating the United States, the disclosure of which is incorporated herein in its entirety by reference.

TECHNICAL FIELD

Embodiments herein relate to radio communication systems, such as telecommunication systems, and in particular to a method and a radio network node for managing a request for a radio access bearer.

BACKGROUND

In a known Long Term Evolution (LTE) system, a concept known as Admission Control has been implemented in order to admit or reject a request for resources for establishing connections for carrying data traffic. When the request is admitted, the connection is established in the form of a radio access bearer such as an Evolved-Radio Access Bearer (E-RAB).

Some data traffic may require a certain Quality of Service (QoS). In that case, a so called QoS profile may be associated with the radio access bearer. The QoS profile may comprise information relating to Guaranteed Bit Rate (GBR), Allocation and Retention Policy (ARP) and the like.

As an example, an eNB of the known LTE system may perform the admission control. In order for the eNB to determine whether or not to admit or reject a request for resources, the eNB is required to monitor resources free for use by data traffic and resources already used by data traffic. Hence, admission control considers resources which are herein referred to as Monitored System Resources (MSR). The MSR may relate to resource blocks, modulation and coding schemes, and the like.

There are two main categories of MSR; dynamic MSRs and static MSRs. Each MSR shall be considered as representing the aggregated resource usage from all traffic.

On the one hand, dynamic MSRs are resources for which the utilization may vary during a lifetime of a radio access bearer. The variations may stem from decisions by the eNB, i.e. a scheduler therein, as well as varying radio conditions or mobility of any user equipments served by the eNB. The utilization of dynamic resources is considered by admission control for E-RABs with a QoS requirement, e.g. Guaranteed Bit Rate (GBR) or a delay requirement.

On the other hand, static resources are resources for which the utilization does not vary during the lifetime of the radio access bearer. These resources may relate to licenses or hardware/software limitations, or be related to a static model of an otherwise dynamic MSR. A specific E-RAB request is mapped by Admission control on to the various MSRs; for a specific E-RAB request only some of the MSRs may be relevant.

Each MSR is characterized by a maximum capacity, such as a maximum number of bits that can be sent. If load, from E-RABs that already have been admitted, equals the maximum capacity on a particular MSR, further requests on the particular MSR are rejected. That is to say, the particular MSR is over-loaded. In other words, Admission Control rejects a request for an E-RAB requiring resources from any over-loaded MSR. Typically, dynamic MSRs are considered for load due to E-RABs with a challenged QoS requirement.

Some special considerations are needed for dynamic MSRs representing load due to E-RABs with a QoS requirement. If too many E-RABs with QoS requirements are admitted, scheduling by the eNB will at some point fail to provide resources to all of them. User equipments may have been admitted at a point in time when radio conditions and mobility were favourable in the sense that the desired QoS, or requested QoS, could be provided. But due to increasing mobility and worsened radio conditions the resources may at a later point in time not be enough to provide the desired QoS for the admitted E-RABs. Admission Control strives for having the load due to E-RABs with QoS requirements below a QoS threshold, which may be expressed as a percentage of the maximum capacity of the MSR.

It does so by rejecting E-RAB requests whenever load due to E-RABs with QoS requirements is above a so called QoS threshold. The QoS threshold may for instance relate to the contribution from all the Guaranteed Bit Rate Bearers (GBR Bearers).

A difference between the maximum capacity of the MSR and the QoS threshold is referred to as a margin. The margin allows for statistical fluctuations with regard to the air interface resources, since the load for high-priority QoS traffic can be limited to a value lower than the maximum level of the resource. Then integrity of the QoS E-RABs is protected with a level of probability since resources above the threshold are free for use by the high-prioritized traffic in congested scenarios. This means that the margin reduces the risk of dropped services on the E-RAB with QoS requirements. The risk will be one minus the level of probability. The level of probability is thus adjusted by setting the threshold to some desired value. Tuning the margin between the threshold and the maximum level of the resource is of special interest when the high-prioritized traffic consists of QoS traffic for which service blocking is desired rather than service dropping. As a consequence, it is desired to have a sufficiently large margin in order to ensure service blocking, i.e. a request for a radio access bearer is rejected, rather than service dropping, i.e. the eNB fails to schedule while fulfilling QoS requirements for an admitted radio access bearer.

In certain scenarios, when for example mobile TV traffic is broadcast by the eNB, some of the MSRs may be become occupied. The mobile traffic may utilize a Multimedia Broadcast/Multicast Service (MBMS) which was introduced in LTE Rel-9. Hence, this kind of traffic may be referred to as MBMS traffic. When some of the MSRs are occupied by mobile TV traffic, a problem may be that a radio access bearer, such as an E-RAB having a QoS profile and which has been admitted, may be dropped due to that the mobile TV traffic is prioritized over the traffic on the radio access bearer under consideration.

SUMMARY

An object is to improve admission control.

According to an aspect, the object is achieved by a method, performed by a radio network node, for managing a request for a radio access bearer. The radio network node determines a first value relating to utilization of radio resources in a first set of subframes. The first set of subframes includes a second set of subframes and a third set of subframes. The second set of subframes is dedicated for transmission by the radio network node to multiple radio communication devices and the third set of subframes is different from the second set of subframes. The radio network node determines a second value relating to utilization of radio resources in the third set of subframes. The radio network node receives, from a network node, the request for the radio access bearer to be used by a radio communication device. The radio network node obtains an indication relating to a capability of the radio communication device to receive transmission, dedicated to the radio communication device, in one or more of the second set of subframes. The radio network node determines a response to the request based on the first value, the second value and the indication. The radio network node sends the response to the network node.

According to another aspect, the object is achieved by a radio network node configured to manage a request for a radio access bearer. The radio network node comprises a processing circuit configured to determine a first value relating to utilization of radio resources in a first set of subframes. The first set of subframes includes a second set of subframes and a third set of subframes. The second set of subframes is dedicated for transmission by the radio network node to multiple radio communication devices. The third set of subframes is different from the second set of subframes. Furthermore, the processing circuit is configured to determine a second value relating to utilization of radio resources in the third set of subframes. The processing circuit is also configured to receive, from a network node, the request for the radio access bearer to be used by a radio communication device and to obtain an indication relating to a capability of the radio communication device to receive a transmission, dedicated to the radio communication device, in one or more of the second set of subframes. Moreover, the processing circuit is configured determine a response to the request based on the first value, the second value and the indication, and to send the response to the network node.

The radio network node determines the first value of utilization and the second value of utilization. Thus, two measures, i.e. the first and second value, of utilization, which are dependent on which subframes, such as the first and third set of subframes, are taken into account, are determined. Correspondingly, the indication indicates which subframes may be used by the radio communication device. Then, the radio network node is able to determine the response, e.g. makes a negative response to reject the request or make a positive response to admit the request, while using the appropriate measure of utilization as given by the indication. The appropriate measure is the one that matches the indication in terms of subframes used for determining the measure and usable by the radio communication device. Therefore, a more accurate response to the request may be sent to the network node. As a result, the above mentioned object is achieved.

Advantageously, as mentioned, embodiments herein achieve improved accuracy in admitting and/or rejecting requests for radio access bearer in conjunction with admission control.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar elements, network nodes, parts, items or features, when applicable.

Figure 1:
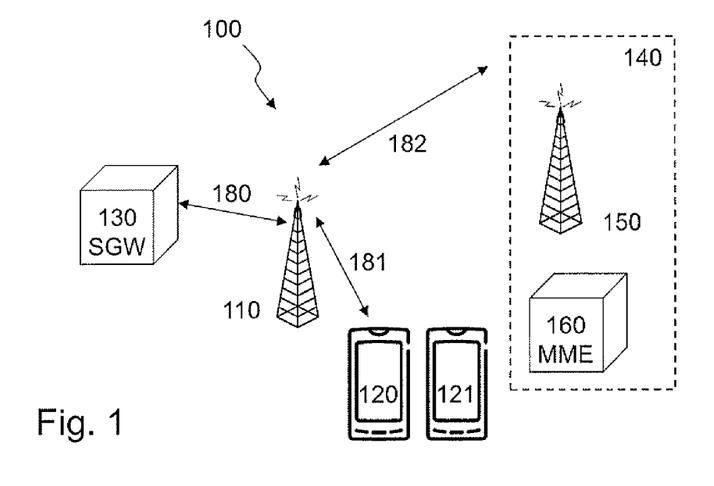
FIG. 1 is a schematic block diagram illustrating embodiments in an exemplifying radio communication system.

FIG. 1 depicts an exemplifying radio communications system 100 in which embodiments herein may be implemented. In this example, the radio communications system 100 is a Long Term Evolution (LTE) system. In other examples, the radio communication system may be any Third Generation Partnership Project (3GPP) cellular communication system based on an LTE system. Furthermore, the radio communication system 100 may be a Wideband Code Division Multiple Access (WCDMA) network, a Global System for Mobile communication (GSM network) etc.

The radio communication system 100 comprises a radio network node 110. As used herein, the term "radio network node" may refer to an evolved Node B (eNB), a control node controlling one or more Remote Radio Units (RRUs), a radio base station, a relay, an access point or the like.

A radio communication device 120 is located in the vicinity of the radio network node 110. Expressed differently, the radio communication device 120 may be associated with, or served by, the radio network node 110. The radio communication device 120 may receive and/or send 181 transmissions from/to the radio network node 110. As used herein, the term "radio communication device" may refer to a user equipment, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

Furthermore, a further radio communication device 121 may be located in the vicinity of the radio network node 110.

Moreover, the radio communication system 100 comprises a serving gateway (SGW) 130. A radio access bearer 180, 181 may be established between the serving gateway 130 and the radio communication device 120 via the radio network node 110. The connection is dedicated for transferring of user data, as opposed to control information as described in the following paragraph.

Furthermore, the radio communication system 100 comprises a network node 140 for handling requests for radio access bearers. The network node 140 may be a further radio network node 150 or a core network node 160 for handling requests for radio access bearers. The core network node 160 may be a Mobility and Maintenance Entity (MME). The core network node 160 may receive and/or transmit 182 control information from/to the radio communication device 120.

Figure 2:
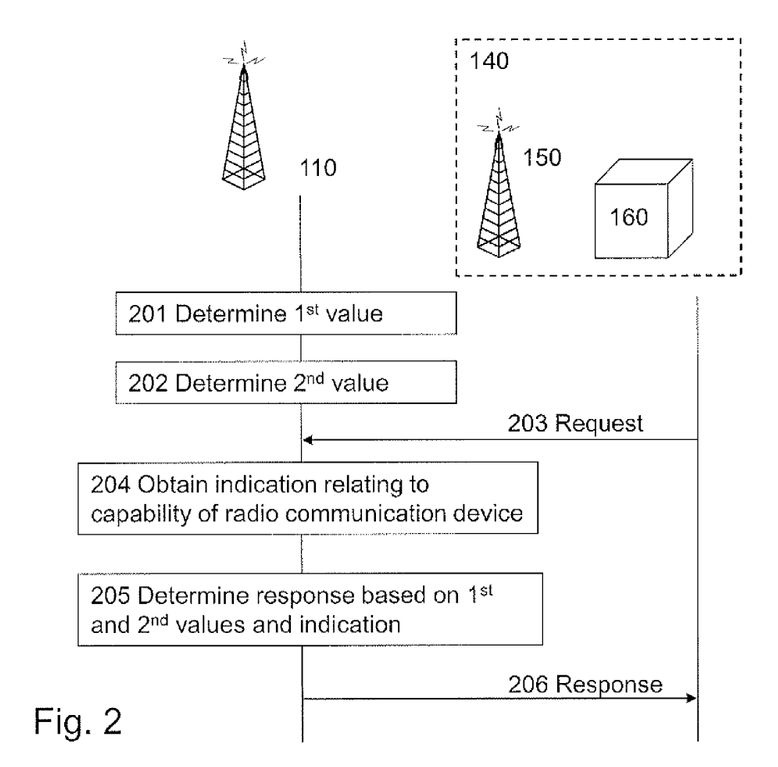
FIG. 2 is a combined signaling scheme and flowchart illustrating embodiments of the methods.

FIG. 2 illustrates an exemplifying method for managing a request for a radio access bearer when implemented in the radio communication system 100 of FIG. 1. In this example, the radio access bearer is an Evolved Radio Access Bearer (ERAB). As another example, the radio access bearer may be a so called Radio Access Bearer while using the nomenclature of WCDMA. The method of FIG. 2 may be performed in conjunction with admission control.

The radio network node 110 may handle different radio resources to be used for setting up and maintaining the radio access bearer. The radio resources may be represented by one or more of: resource blocks; a number of bits; and a number of processor cycles of a processing circuit comprised in the radio network node 110, modulation and coding schemes and the like. It shall, hence, be noted that the term "radio resource" is used not only for over-there-air radio resources relating to time and frequency, but also to processing resources, in terms of for example the radio network node's 110 capacity to process bits for transmission or number of available processing cycles for processing of bits for transmission.

The following actions may be performed in any suitable order.

Action 201

The radio network node 110 determines a first value relating to utilization of radio resources in a first set of subframes.

The first value may be based on actual utilization when the first set of subframes may relate to past, or historical, subframes. In other examples, the first value may be a prediction of utilization for the first set of subframes. One form of prediction is to assume the utilization to be the same as for some past set of subframes. The first value may be used in action 205 depending on result of action 204 as described below.

As mentioned above, the radio resources may be represented by many different measures, such as bits or processing cycles, therefore the first value may include further values corresponding to each of the different measures. The determination of the first value is elaborated in section "Determination of utilization" below.

The first set of subframes includes a second set of subframes and a third set of subframes. The second set of subframes is dedicated for transmission by the radio network node 110 to multiple radio communication devices 120, 121. The second set of subframes may be MBSFN subframes, which are known in the art—see also section "MBSFN subframes" below. The third set of subframes is different from the second set of subframes and the third set of subframes may be subframes other than the MBSFN subframes.

It shall here be said that utilization may be understood as relating to radio resources that are free to use, referred to as free radio resources, or radio resources that are occupied, referred to as occupied radio resources. Free radio resources refers to radio resources which may be used by the radio communication device 120 for receiving/transmitting user data, because the free radio resources do not carry any user data. Conversely, occupied radio resources refer to radio resources which may not be used by the radio communication device 120, because the occupied radio resources do carry user data. When the radio resources are represented by the number of bits, the number of bits may be those bits in transmissions of the first set of subframes that are not used for carrying user data, i.e. free bits.

In connection herewith, it shall be said that available radio resources refers to radio resources that the radio communication device is capable of using as indicated by an indication as explained in action 204. Thus, available radio resources include free as well as occupied radio resources.

Action 202

The radio network node 110 determines a second value relating to utilization of radio resources in the third set of subframes. In this manner, the radio network node 110 will be able to use either the first value or the second value in action 205 depending on result of action 204 as described below. As mentioned above, see also section "Determination of utilization" for how the second value may be determined.

Action 203

When for example the network node 140, 150, 160 needs to hand-over the radio communication device 120 to the radio network node 110, the radio network node 110 receives, from the network node 140, 150, 160, the request for the radio access bearer to be used by a radio communication device 120. In this manner, set up of the radio access bearer may be initiated such that for example the hand-over may be completed.

The request may be an X2 AP handover request, an S1 AP handover request or an S1 AP ERAB set up request, which requests are known from specifications provided by 3GPP.

The radio communication device 120 may, or may not, be included among the multiple radio communication devices 120, 121 mentioned in action 201. This means that the radio communication device 120 may or may not receive MBMS traffic in addition to potential uni-cast traffic on the radio access bearer to be established.

The radio communication device 120 may be associated with the radio access bearer in that the radio access bearer is to be established between the radio communication device 120 and a serving gateway 130 for serving the radio communication device 120. The serving gateway 130 serves the radio communication device with respect to e.g. user data transmissions or user data traffic.

Action 204

The radio network node 110 obtains an indication relating to a capability of the radio communication device 120 to receive transmission, dedicated to, or dedicated only to, the radio communication device 120, in one or more of the second set of subframes. In more detail, the indication may relate to the capability of the radio communication device 120 to receive user data as uni-cast transmission(s). The user data may be receivable from the serving gateway 130 and may be carried by the radio access bearer when the radio access bearer has been established.

In some embodiments, the obtaining 204 of the indication relating to the capability of the radio communication device 120 to receive user data as uni-cast transmission in the one or more of the second set of subframes may comprise receiving the indication from the further radio network node 110 or the core network node 140, 150, 160, or receiving the indication from the radio communication device 120.

Expressed differently, different kinds of radio communication devices 120, 121, as indicated by the indication, may have different levels of access to, or possibility to use, the radio resources of a certain subframe. In some examples, the level of access depends on whether a subframe is an MBSFN subframe or not. The different levels of access may be represented by the first value relating to load due to unicast QoS traffic on any subframe and the second value relating to load due to unicast QoS traffic on subframes with no MBMS. This means that an actual utilization of the MBSFN subframe is considered by adjusting the maximum capacity.

Examples are given in section "Obtaining the indication" below.

Action 205

The radio network node 110 determines a response to the request based on the first value, the second value and the indication. In this manner, the response is configured to indicate that the request is admitted or rejected. In particular, the radio network node 110 may perform uni-cast admission control of the radio access bearer, such as an E-RAB, with QoS requirements.

In some embodiments, the indication may indicate that the radio communication device 120 is capable of receiving user data as uni-cast transmission in one or more of the second set of subframes. Then, the determining 205 of the response may further comprise the action of setting the response to indicate that the request is admitted when the first value is below a first threshold value for admitting the request. When the first value concerns free radio resources, the request is admitted when the first value is above the first threshold. In these embodiments, the radio communication device 120 may be configured according to Release-10 of LTE, LTE-Advanced radio technology, and/or an Evolved Universal Terrestrial Radio Access (E-UTRA) network.

The radio communication device 120 may be set to transmission mode 9 (TM9). TM9 is known from 3GPP TS 36.331.

Moreover, according to these embodiments, a greater number of requests may be admitted than if MBMS traffic is assumed to be present, and fully utilizing the second set of subframes, all the time, since the first value reflects actual utilization in the second set of subframes. As a comparison, should the radio network node 110 assume MBMS traffic to be present all the time, the radio network node 110 would never find out that there are free radio resources in the second set of subframes. Therefore, the request would be rejected as soon as there are no free radio resources in the third set of subframe.

In contrast, according to these embodiments, a fewer number of requests may be admitted than if MBMS is assumed to be non-present all the time, since the first value reflect actual utilization in the second set of subframes. As a comparison, should MBMS traffic be assumed to be non-present all the time, the radio network node 110 would always assume there are free radio resources in the second set of subframes, at least while considering utilization due to MBMS traffic. Hence, many requests will be admitted. Disadvantageously, this may lead to service dropping in case the actual utilization in the second set of subframes increases due to that MBMS traffic will be prioritized over uni-cast traffic.

In some embodiments, the indication may indicate that the radio communication device 120 is un-capable of receiving user data as uni-cast transmission in the second set of subframes. Then, the determining 205 of the response may further comprise the action of setting the response to indicate that the request is admitted when the second value is below a second threshold value for admitting the request. In these embodiments, the radio communication device 120 may be configured according to Release-8 or Release-9 of LTE, LTE-Advanced radio technology, and/or an Evolved Universal Terrestrial Radio Access (E-UTRA) network.

In these embodiments, the radio communication device 120 is not able to take advantage of any free radio resources in the second set of subframes. Therefore, with respect to the radio communication device 120 in this embodiment, the MBMS traffic may, rightfully, be assumed to be present, and fully utilize the second set of subframes, all the time.

Advantageously, the risk of service dropping is reduced since the request is only admitted when the radio resources, which the radio communication device 120 in fact is capable of using, are sufficient. The radio resources are sufficient when the second value is below the second threshold as mentioned above.

The first and second thresholds are different and are preferably set in relation to a maximum capacity of the radio resource considered. As an example, a general threshold may be determined as a percentage of the maximum capacity. The maximum capacity is dependent on the usable subframes, such as the first set of subframes and the third set of subframes. Then, the first and second threshold becomes different since the maximum capacity is different due to differing number of subframes. Hence, the first and second thresholds may be generated from one general threshold.

Moreover, each of the first and second thresholds may be dependent on whether the request relates to handover or setup. E.g. a request type may indicate whether the request relates to handover or setup. Typically, in case of setup, rejection of the request is preferred over service dropping. In contrast, in case of handover, admission of the request is preferred over rejection. Hence, different thresholds may need to be used while taking the request type into account.

Furthermore, each of the first and second thresholds may be dependent on the radio resources. That is to say, different threshold values may be used for different types of radio resources. For example, thresholds relating to utilization on resource blocks can be different from thresholds relating to utilization on number of bits transmitted or number of number of processor cycles spent.

Action 206

In order to make the network node 140, 150, 160 aware of whether the request is admitted or rejected, the radio network node 110 sends the response to the network node 140, 150, 160. In this manner, admission of the request is controlled.

As explained in action 201 to 206, the use of the first and second values and that differentiation by means of the indication makes managing of the request, e.g. in conjunction with admission control for unicast E-RABs with QoS requirements, more accurate.

The order of the actions above is one example. In other examples, the actions may be performed as follows. Hence, according to an exemplifying embodiment, the radio network node 110 is able to schedule downlink transmissions in MBSFN subframes for sending of for example a mobile TV traffic. Then, the radio network node 110 receives a request for a radio access bearer to be used by a radio communication device 120. The radio access bearer may be an E-RAB with a QoS profile associated with it. Next, the radio network node 110 obtains an indication relating to a capability of the radio communication device 120 to receive transmission, dedicated to the radio communication device 120, in one or more of the second set of subframes. Furthermore, the radio network node 110 determines a value relating to utilization of radio resources based on the indication. The determining may include calculation of a first and second value indicative of utilization while considering MBSFN subframes and while considering non-MBSFN subframes, respectively. That is to say, values of utilization to be applied for different values of the indication may be calculated periodically whereby these values may be available for use, by the radio network node 110, when needed according to the obtained indication. Next, the radio network node 110 determines a response to the request based on the value in relation to a threshold for admitting the request. In this example, the value may be expressed as a percentage. Therefore, only one threshold is needed as compared to in the example described above. Finally, the radio network node 110 sends the response to the network node 140, 150, 160.

Here follows a more in depth analysis of different aspects of how allocation in MBSFN subframes may be done. The allocation in MBSFN subframes for MBMS sessions is semi-statically configured and not expected to change very often to avoid frequent system information changes. Consequently, the actual usage of the allocated MBSFN subframes strongly depends on the number of ongoing MBMS sessions. Furthermore, over allocation of MBSFN subframes can be expected because the MBSFN subframe allocation is based on the maximum bit rate (MBR) which of course is a maximum values that is not reached all the time. Thereby, it is only when the MBR is reached that the MSFN subframes are fully allocated.

If presence of MBMS sessions is not considered by admission control, unicast QoS traffic sessions will suffer since there is less capacity in terms of radio resources available.

On the other hand, if the QoS threshold is dimensioned assuming presence of MBMS traffic sessions all the time, radio resources will be wasted, since the QoS threshold, such as the first and second threshold, is lowered. Underutilizing capacity is most severe when no MBMS session is requested at all, at any time.

Furthermore, different user equipments (UEs), such as the radio communication device 120, have different capabilities with regard to accessing resources on MBSFN subframes. Rel-8/9 UEs ignore assignments in MBSFN subframes, whereas TM9 UEs introduced in Rel-10 can be scheduled in MBSFN subframes. This means that different kinds of UEs experience the load differently.

A problems with UEs having different capability use radio resources, such as resource blocks on PDSCH, and for processing load that represents the capacity of the radio network node 110 to process layer 1, or layer 2, bits on Physical Downlink Shared Channel (PDSCH), or DownLink Shared Channel (DL-SCH), per subframe. As the case for resource blocks on PDSCH, such radio resources may be associated with a maximum value of layer 1, or layer 2, bits on PDSCH, or DL-SCH, per subframe that can be processed, and later transmitted. Since a Rel-8/9 UE cannot access MBSFN subframes, it cannot benefit from the processing capacity in these subframes and will therefore only introduce processing load on the non-MBSFN subframes. Models of processing capacity based on processor cycles spent per subframe to process layer 1 (layer 2) bits are also possible. In these models, a certain amount of bits are expected to be processed during one processor cycle.

Determination of Utilization

An exemplifying way of determining utilization, e.g. the first value and the second value, while considering load due to MBMS is presented in the following.

In a first example, the maximum capacity of radio resources may be adjusted in view of MBSFN subframes as follows. For a period of time T, accumulate the total (maximum) capacity of the radio resources MAXX available for the radio communication devices of type X and the amount of these resources NX,PRIO used by higher-prioritized traffic, e.g. MBMS sessions. This means that the total capacity of the radio resources MAXX will be different depending on whether the first or second value is determined, i.e. also depending on the indication. The amount of radio resources available for unicast traffic is retrieved by subtracting NX,PRIO from MAXX. Also during the same period of time T, out of the total amount of radio resources MAXX accumulate the total amount of resources NX used by, i.e. occupied by, the radio communication device with challenged QoS requirements.

After a period T has expired calculate the load LX due to QoS E-RABs $$LX=NX/(MAXX-NX,PRIO)$$

for each radio resource. The specific value of NX,PRIO depends on the nature of the radio resource; for some resources as e.g. CCEs on the PDCCH resource the contribution from MBMS to NX,PRIO is zero. Note that if the radio resources involve a static model of a dynamic resource, e.g. based on GBR values of the GBR QoS Information, any averaging procedure over a period of time T is not needed; dead counting will in this case be enough.

In a second example, the load due to MBMS sessions may be seen as included in the radio resources used for unicast:

$$LX=(NX+NX,PRIO)/MAXX$$

The parameters have the same meaning as in the first example. The difference in the first and second example is that one needs to select different values for the QoS threshold to achieve the same behavior in terms of QoS performance of the admitted E-RABs.

In a third example, the QoS threshold may be adjusted to the MBMS load.

In general, the probability for admission of the request could be any function of the load on the radio resources, or the utilization of the radio resources.

Figure 3:
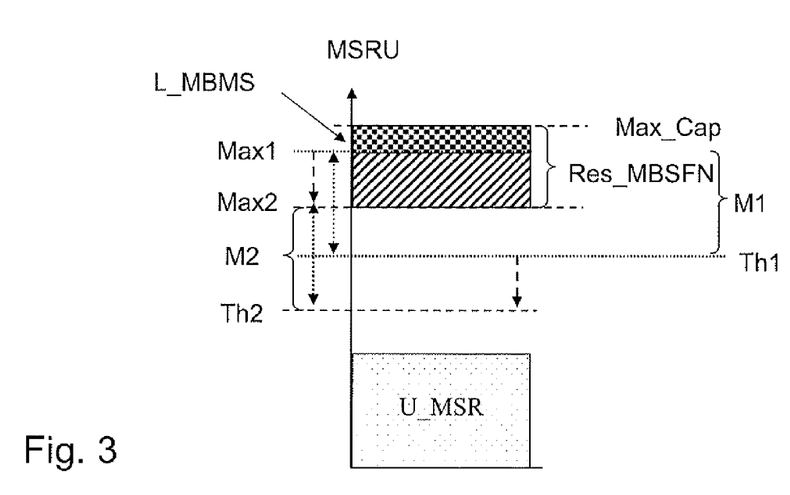
FIG. 3 is an exemplifying diagram illustrating utilization of radio resources.

In FIG. 3, a diagram illustrating utilization of a particular radio resource is shown. The utilization MSRU is indicated along the ordinate and the particular radio resource is indicated along the abscissa. In this example, only one radio resource is illustrated for reasons of simplicity.

To begin with, consider the case when the indication indicates that the radio communication device is capable of receiving dedicated transmission in the second set of subframes, then maximum capacity of the radio resource Max_Cap is reduced by utilization due to MBMS traffic L_MBMS to a reduced maximum capacity Max1. The utilization due to MBMS traffic L_MBMS indicates a portion of the radio resources reserved for MBMS Res_MBMS. Then, the first threshold Th1, as discussed in conjunction with FIG. 2, may equal Max1 reduced by a first margin M1.

Further, consider the case when the indication indicates that the radio communication device is not capable of receiving dedicated transmission in the second set of subframes. In such case, the maximum capacity of the radio resource Max_Cap is reduced by the radio resources reserved for MBMS Res_MBMS to a reduced maximum capacity Max2. Then, the second threshold Th2, as discussed in conjunction with FIG. 2, may be equal to Max2 reduced by a second margin M2, which may be equal to the first margin M1.

The first and second thresholds Th1, Th2 may be dependent on which radio resource is considered. For example, if the radio resource relates to number of available processing cycles, it may be desired that the first and second thresholds are less conservative, i.e. less margins are implied, as compared to a case when the radio resources relate to resource blocks for which fluctuations due to mobility and varying radio environment should be prominent. The number of available processing cycles depends on the indication, since the for a type X radio communication device downlink transmission may become scheduled earlier than for a radio communication device not capable of receiving uni-cast in MBSFN subframes.

Figure 4:
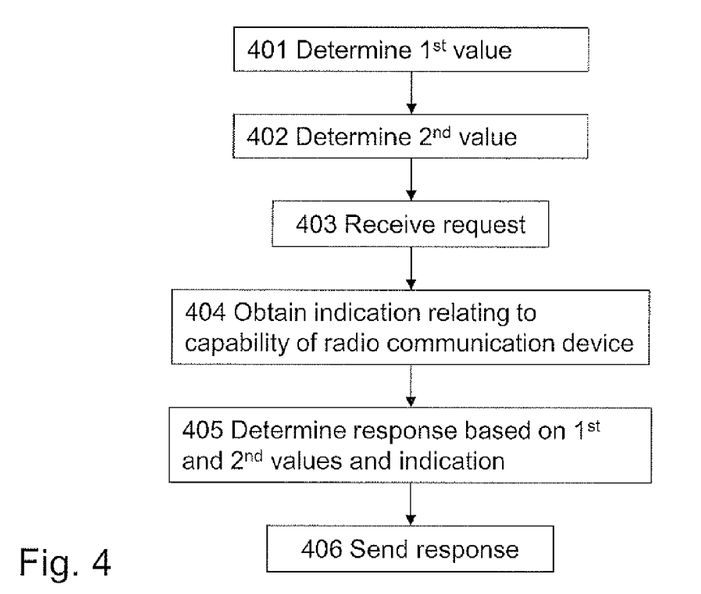
FIG. 4 is a flowchart illustrating embodiments of the method in the radio network node.

In FIG. 4, an exemplifying, schematic flowchart of the methods of FIG. 2 when seen from the radio network node 110 is shown. Hence, the radio network node 110 performs a method for managing a request for a radio access bearer. The radio access bearer may be an Evolved Radio Access Bearer ERAB.

The following actions may be performed in any suitable order.

Action 401

The radio network node 110 determines 201 a first value relating to utilization of radio resources in a first set of subframes. The first set of subframes includes: a second set of subframes and a third set of subframes. The second set of subframes is dedicated for transmission by the radio network node 110 to multiple radio communication devices 120, 121. The third set of subframes is different from the second set of subframes. The second set of subframes may be MBSFN subframes and the third set of subframes may be subframes other than the MBSFN subframes.

The radio resources may be represented by one or more of: resource blocks; a number of bits; and a number of processor cycles of a processing circuit comprised in the radio network node 110. Each of the resource blocks may comprise one subframe in the time domain and 12 subcarriers in the frequency domain.

This action is similar to action 201.

Action 402

The radio network node 110 determines a second value relating to utilization of radio resources in the third set of subframes. This action is similar to action 202.

Action 403

The radio network node 110 receives, from a network node 140, 150, 160, the request for the radio access bearer to be used by a radio communication device 120. The network node 140, 150, 160 may be a further radio network node 110 or a core network node 140, 150, 160.

The radio communication device 120 may be associated with the radio access bearer in that the radio access bearer is to be established, via the radio network node 110, between the radio communication device 120 and a serving gateway 130 for serving the radio communication device 120.

The radio communication device 120 may be set to transmission mode 9 TM9.

The radio network node 110 and the radio communication device 120 may be comprised in a radio communication system 100 based on a Long Term Evolution system.

This action is similar to action 203.

Action 404

The radio network node 110 obtains an indication relating to a capability of the radio communication device 120 to receive transmission, dedicated to the radio communication device 120, in one or more of the second set of subframes. The indication may relate to the capability of the radio communication device 120 to receive user data as uni-cast transmission, wherein the user data is receivable from the serving gateway 130.

In some embodiments, the obtaining 204 of the indication relating to the capability of the radio communication device 120 to receive user data as uni-cast transmission in the one or more of the second set of subframes may comprise:

receiving the indication from the further radio network node 110 or the core network node 140, 150, 160; or receiving the indication from the radio communication device 120.

This action is similar to action 204.

Action 405

The radio network node 110 determines a response to the request based on the first value, the second value and the indication.

In some embodiments, the indication may indicate that the radio communication device 120 is capable of receiving user data as uni-cast transmission in one or more of the second set of subframes. Then, the determining 205 of the response may further comprise the action of setting the response to indicate that the request is admitted when the first value is below a first threshold value for admitting the request.

In some embodiments, the indication may indicate that the radio communication device 120 is un-capable of receiving user data as uni-cast transmission in the second set of subframes. Then, the determining 205 of the response may further comprise the action of setting the response to indicate that the request is admitted when the second value is below a second threshold value for admitting the request.

This action is similar to action 205.

Action 406

The radio network node 110 sends the response to the network node 140, 150, 160. This action is similar to action 206.

Figure 5:
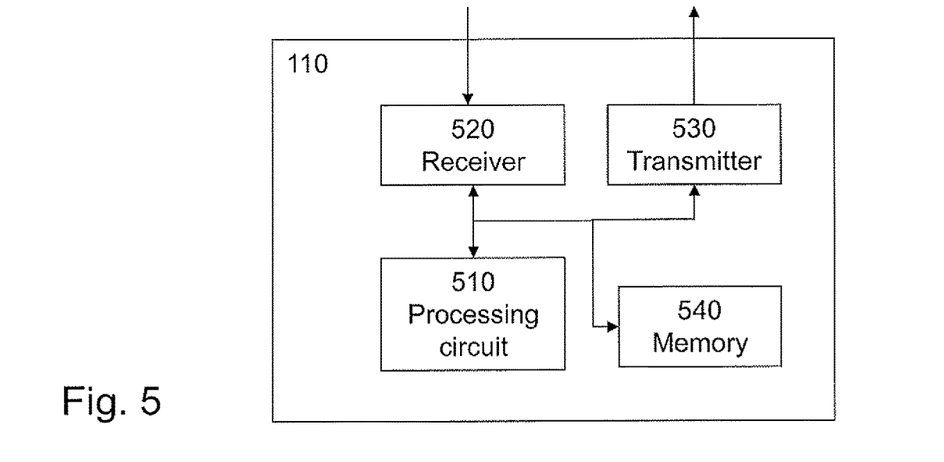
FIG. 5 is a block diagram illustrating embodiments of the radio network node.

With reference to FIG. 5, a schematic block diagram of the radio network node 110 is shown. The radio network node 110 is configured to perform the methods in FIGS. 2 and/or 4. The radio network node 110 is configured to manage a request for a radio access bearer.

The radio communication device 120 may be associated with the radio access bearer in that the radio access bearer is to be established, via the radio network node 110, between the radio communication device 120 and a serving gateway 130 for serving the radio communication device 120.

The indication may relate to the capability of the radio communication device 120 to receive user data as uni-cast transmission, wherein the user data is receivable from the serving gateway 130.

The radio communication device 120 may be set to transmission mode 9, "TM9".

The radio access bearer may be an Evolved Radio Access Bearer, "ERAS".

The radio network node 110 and the radio communication device 120 may be comprised in a radio communication system 100 based on a Long Term Evolution system.

Each of the resource blocks may comprise one subframe in the time domain and 12 subcarriers in the frequency domain.

The second set of subframes may be MBSFN subframes and the third set of subframes may be subframes other than the MBSFN subframes.

The radio resources may be represented by one or more of: resource blocks; a number of bits; and a number of processor cycles of the processing circuit comprised in the radio network node 110.

The network node 140, 150, 160 may be a further radio network node 110 or a core network node 140, 150, 160.

The radio network node 110 comprises a processing circuit 510 configured to determine a first value relating to utilization of radio resources in a first set of subframes. The first set of subframes includes a second set of subframes and a third set of subframes. The second set of subframes is dedicated for transmission by the radio network node 110 to multiple radio communication devices 120, 121. The third set of subframes is different from the second set of subframes.

Furthermore, the processing circuit 510 is configured to determine a second value relating to utilization of radio resources in the third set of subframes. The processing circuit 510 is also configured to receive, from a network node 140, 150, 160, the request for the radio access bearer to be used by a radio communication device 120 and to obtain an indication relating to a capability of the radio communication device 120 to receive a transmission, dedicated to the radio communication device 120, in one or more of the second set of subframes.

Moreover, the processing circuit 510 is configured determine a response to the request based on the first value, the second value and the indication, and to send the response to the network node 140, 150, 160.

In some embodiments, the indication may indicate that the radio communication device 120 is capable of receiving user data as uni-cast transmission in one or more of the second set of subframes. Then, the processing circuit 510 may further be configured to set the response to indicate that the request is admitted when the first value is below a first threshold value for admitting the request.

In some embodiments, the indication may indicate that the radio communication device 120 is capable of receiving user data as uni-cast transmission in the second set of subframes. Then, the processing circuit 510 may further be configured to set the response to indicate that the request is admitted when the second value is below a second threshold value for admitting the request.

The radio network node 110 according to claim 18, wherein the processing circuit 510 further is configured to: receive the indication from the further radio network node 110 or the core network node 140, 150, 160; or receive the indication from the radio communication device 120.

The processing circuit 710 may be a processing unit, a processor, an application specific integrated circuit (ASIC), a field-programmable gate array (FPGA) or the like. As an example, a processor, an ASIC, an FPGA or the like may comprise one or more processor kernels.

The radio network node 110 further comprises a transmitter 520, which may be configured to send one or more of the response and other numbers, values or parameters described herein.

The radio network node 110 further comprises a receiver 530, which may be configured to receive one or more of the request and other numbers, values or parameters described herein.

The radio network node 110 further comprises a memory 540 for storing software to be executed by, for example, the processing circuit. The software may comprise instructions to enable the processing circuit to perform the method in the radio network node 110 described above in conjunction with FIGS. 2 and/or 4. The memory may be a hard disk, a magnetic storage medium, a portable computer diskette or disc, flash memory, random access memory (RAM) or the like. Furthermore, the memory may be an internal register memory of a processor.

MBSFN Subframes

Figure 6:
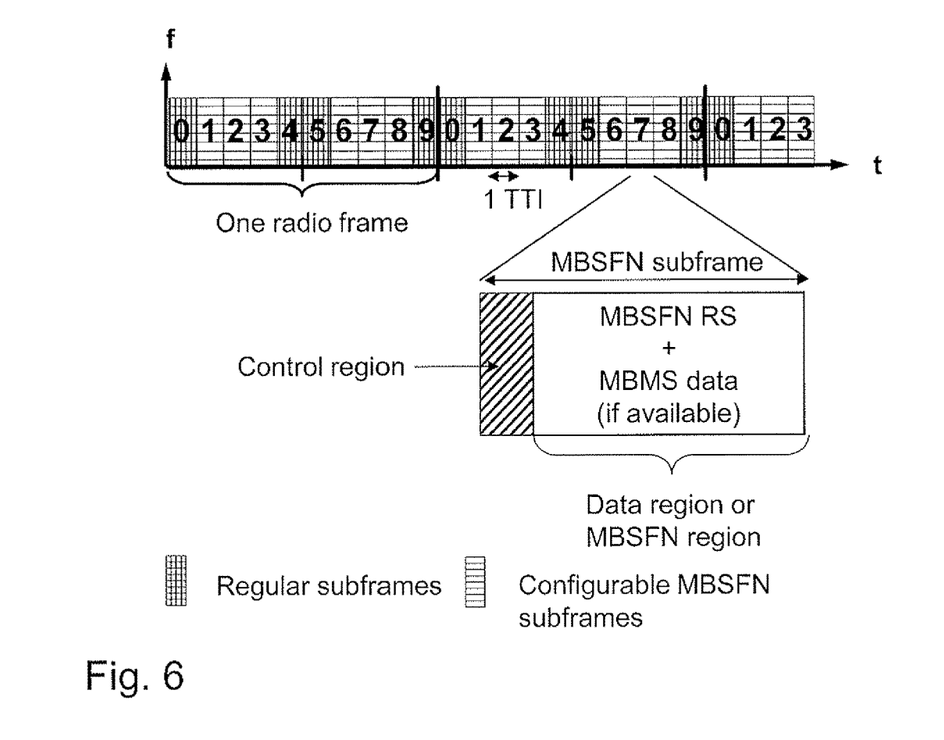
FIG. 6 is a subframe structure illustrating MBSFN according to prior art.

In FIG. 6, a block diagram illustrating MBMSF subframes is shown. In order to efficiently support broadcast/multicast transmission, Multimedia Broadcast/Multicast Service (MBMS) was introduced in LTE Rel-9. MBMS single frequency networks (MBSFN) coordinate the transmission of MBMS data among a group of radio network nodes such that all involved radio network nodes transmit the same data at exactly the same time and frequency resources. From a terminal perspective all signals combine over the air resulting in an improved signal to interference and noise ratio (SINR).

MBMS transmission in MBSFN mode is carried on the Physical Multicast Channel (PMCH) and performed in so-called MBSFN subframes. In all LTE Releases, i.e. Rel-8 to LTE Rel-10, there is only a limited number of MBSFN subframes which can be configured, in FDD mode this can be 6 out of 10 subframes in a radio frame, and in TDD mode this can be 5 out of 10 subframes. Thus, unicast and MBMS transmission is time-multiplexed on a so-called mixed carrier.

All subframes consist of a control region and a data region. Uplink grants and downlink assignments are provided in the control region of a subframe, while data is transmitted in the data region, which carries the Physical Downlink Shared Channel (PDSCH) in regular subframes. As used herein, regular subframes refers to non-MBSFN subframes. Regular subframes provide cell-specific reference signals (RS) in the control and the data region. In MBSFN subframes, where the control region is also referred to as non-MBSFN region and the data region as MBSFN region, only the control region provides cell-specific RS, while the MBSFN region carries MBMS data, which is transmitted in MBSFN mode with MBSFN specific RS. Therefore, legacy radio communication devices typically ignore MBSFN subframes for measurements and do not expect unicast downlink transmission on PDSCH in MBSFN subframes and thus, they also ignore downlink assignments in the control region. However, uplink grants in the control region of a MBSFN subframe are not ignored. Apart from MBMS, MBSFN subframes can also be configured for relaying or positioning purposes.

Obtaining the Indication

The following detailed example applies to the case when the radio communication system is an LTE system, comprising a radio interface according to Evolved Universal Terrestrial Access Network (E-UTRAN).

The radio communication device 120 may signal its "UE capabilities", i.e. user equipment capability, to the radio network node 110, as specified in Section 5.6.3 of 3GPP TS 36.331, such that the radio network node 110 is able to make the appropriate decision when determining the response in action 205.

The UECapabilityInformation message contains the UE-EUTRACapability Information Element (IE), which carries physical layer parameters.

UECapabilityInformation Message:

[...]
UECapabilityInformation-r8-IEs ::= SEQUENCE {
  ue-CapabilityRAT-ContainerList    UE-CapabilityRAT-ContainerList,
[...]

UE-CapabilityRAT-ContainerList

The IE UE-CapabilityRAT-ContainerList contains list of containers, one for each RAT for which UE capabilities are transferred, if any.

UE-CapabilityRAT-ContainerList Information Element:

-- ASN1START
UE-CapabilityRAT-ContainerList ::=SEQUENCE (SIZE (0..maxRAT-Capabilities)) OF
UE-CapabilityRAT-Container
UE-CapabiiityRAT-Container ::= SEQUENCE {

-continued

```
    rat-Type                    RAT-Type,
    ueCapabilityRAT-Container   OCTET STRING
}
-- ASN1STOP
UECapabiiityRAT-ContainerList field descriptions
    ueCapabilityRAT-Container
        Container for the UE capabilities of the indicated RAT.
```

The encoding is defined in the specification of each RAT:

```
For E-UTRA: the encoding of UE capabilities is defined in IE
UE-EUTRA-Capability.
        [...]
PhyLayerParameters-v1020 ::=    SEQUENCE {
    [...]
    tm9-With-8Tx-FDD-r10        ENUMERATED {supported}
        OPTIONAL,
    [...]
}
```

The tm9-With-8Tx-FDD-r10 IE defines whether the radio communication device 120 supports PDSCH transmission mode 9 with 8 Channel State Information (CSI) reference signal ports for FDD and thus, PDSCH transmission in MBSFN subframes.

At handover from the further radio network node 150 to the radio network node 110, the UE capability information is forwarded to the radio network node 110 in the Handover-PreparationInformation message, HandoverPreparationInformation Message:

```
-- ASN1START
[...]
HandoverPreparationInformation-r8-IEs ::= SEQUENCE {
    ue-RadioAccessCapabilityInfo    UE-CapabilityRAT-ContainerList,
    [...]
}
```

Furthermore, the indication may be obtained by sending a UECapabilityRequest to the radio communication device 120. This requires the radio communication device 120 to be in RRC_CONNECTED mode and that a Signalling Radio Bearer (SRB) has been established.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a radio network node, for managing a request for a radio access bearer, the method comprising:
   determining a first value indicating a utilization of radio resources in a first set of subframes, wherein the first set of subframes includes: (i) a set of Multicast-Broadcast Single-Frequency Network, MBSFN, subframes and (ii) a set of non-MBSFN subframes;
   determining a second value indicating a utilization of radio resources in the set of non-MB SFN subframes;
   receiving, from a network node, the request for the radio access bearer to be used by a radio communication device;
   receiving device capability information that indicates whether the radio communication device is capable of receiving user data as a unicast transmission in the set of MBSFN subframes;
   selecting one of the first value and the second value based on the device capability information, such that, if the device capability information indicates that the radio communication device is capable of receiving user data as a unicast transmission in the set of MBSFN subframes, then the first value is selected, otherwise the second value is selected;
   comparing the selected value to a threshold;
   determining a response to the request based on a result of the comparison; and
   sending to the network node the determined response to the request.

2. The method according to claim 1, further comprising:
   determining that the selected value is below the threshold; and
   as a result of determining that the selected value is below the threshold, setting the response to indicate that the request is admitted.

3. The method according to claim 1, wherein the radio resources are represented by one or more of:
   resource blocks;
   a number of bits; and
   a number of processor cycles of a processing circuit comprised in the radio network node.

4. The method according to claim 1, wherein the network node is a further radio network node or a core network node.

5. The method according to claim 1, wherein the radio communication device is associated with the radio access bearer in that the radio access bearer is to be established, via the radio network node, between the radio communication device and a serving gateway for serving the radio communication device.

6. The method according to claim 1, wherein the indication relates to the capability of the radio communication device to receive user data as a uni-cast transmission, wherein the user data is receivable from the serving gateway.

7. The method according to claim 1, wherein the radio communication device is set to transmission mode 9, TM9.

8. The method according to claim 1, wherein the radio access bearer is an Evolved Radio Access Bearer, ERAB.

9. The method according to claim 1, wherein the radio network node and the radio communication device are comprised in a radio communication system based on a Long Term Evolution system.

10. The method according to claim 1, wherein each of the resource blocks comprises one subframe in the time domain and 12 subcarriers in the frequency domain.

11. A radio network node configured to manage a request for a radio access bearer, wherein the radio network node comprises a processing circuit configured to:
   determine a first value indicating a utilization of radio resources in a first set of subframes, wherein the first set of subframes includes: (i) a set of Multicast-Broadcast Single-Frequency Network, MBSFN, subframes and (ii) a set of non-MBSFN subframes;
   determine a second value indicating a utilization of radio resources in the set of non-MBSFN subframes;
   receive, from a network node, the request for the radio access bearer to be used by a radio communication device;

receive device capability information that indicates whether the radio communication device is capable of receiving user data as a uni-cast transmission in the set of MBSFN subframes;

select one of the first value and the second value based on the device capability information, such that, if the device capability information indicates that the radio communication device is capable of receiving user data as a unicast transmission in the set of MBSFN subframes, then the first value is selected, otherwise the second value is selected;

compare the selected value to a threshold;

determine a response to the request based on a result of the comparison; and send to the network node the determined response to the request.

12. The radio network node according to claim 11, wherein the processing circuit further is configured to:
determine that the selected value is below the threshold; and
as a result of determining that the selected value is below the threshold, set the response to indicate that the request is admitted.

13. The radio network node according to claim 11, wherein the radio resources are represented by one or more of:
resource blocks;
a number of bits; and
a number of processor cycles of a processing circuit comprised in the radio network node.

14. The radio network node according to claim 11, wherein the network node is a further radio network node or a core network node.

15. The radio network node according to claim 11, wherein the radio communication device is associated with the radio access bearer in that the radio access bearer is to be established, via the radio network node, between the radio communication device and a serving gateway for serving the radio communication device.

16. The radio network node according to claim 11, wherein the indication relates to the capability of the radio communication device to receive user data as a uni-cast transmission, wherein the user data is receivable from the serving gateway.

17. The radio network node according to claim 11, wherein the radio communication device is set to transmission mode 9, TM9.

18. The radio network node according to claim 11, wherein the radio access bearer is an Evolved Radio Access Bearer, ERAB.

19. The radio network node according to claim 11, wherein the radio network node and the radio communication device are comprised in a radio communication system based on a Long Term Evolution system.

20. The radio network node according to claim 11, wherein each of the resource blocks comprises one subframe in the time domain and 12 subcarriers in the frequency domain.

21. The method of claim 1, wherein the determined first value is a prediction of the utilization of radio resources in the first set of subframes.

22. The method of claim 1, wherein determining the first value comprises:
determining a total capacity of radio resources available for a certain type of communication device;
determining the amount of said radio resources used for MBMS sessions; and
calculating TC–M, wherein TC is the determined total capacity and M is the determined amount of said radio resources used for MBMS sessions.

23. The method of claim 1, wherein the request is an X2 AP handover request transmitted by the network node, wherein the network node is a base station.

24. The method of claim 1, wherein the device capability information indicates whether or not the device supports PDSCH transmission mode 9.

25. The method of claim 24, further comprising:
determining that the device capability information indicates that the device supports PDSCH transmission mode 9, wherein
selecting one of the first value and the second value based on the device capability information comprises selecting the first value as a result of determining that the device capability information indicates that the device supports PDSCH transmission mode 9.

26. The method of claim 1, wherein the device capability information indicates whether or not the device supports PDSCH transmission in MBSFN subframes.

27. The method of claim 26, further comprising:
determining that the device capability information indicates that the device supports PDSCH transmission in MBSFN subframes, wherein
selecting one of the first value and the second value based on the device capability information comprises selecting the first value as a result of determining that the device capability information indicates that the device supports PDSCH transmission in MBSFN subframes.

* * * * *